ns patent

[19] United States Patent
Kebbon et al.

[11] 4,335,323
[45] Jun. 15, 1982

[54] STAMPED SHEET METAL FRAME FOR DYNAMOELECTRIC MACHINE

[75] Inventors: Earl R. Kebbon, Farmington, Me.; Bobby E. McMillen, Columbus, Miss.; Kenneth W. Stewart, Sr., Columbus, Miss.; Dennis A. Bloodworth, Jr., Columbus, Miss.

[73] Assignee: AMBAC Industries, Incorporated, Farmington, Conn.

[21] Appl. No.: 113,078

[22] Filed: Jan. 17, 1980

[51] Int. Cl.³ ............................................. H02K 5/00
[52] U.S. Cl. ........................... 310/40 R; 310/40 MM; 310/42; 310/90; 310/154; 310/239
[58] Field of Search ............. 310/40 R, 40 MM, 239, 310/46, 89, 90, 254, 249, 42, 154, 245, 247

[56] References Cited

U.S. PATENT DOCUMENTS

| | | | |
|---|---|---|---|
| 3,156,838 | 11/1964 | Winther | 310/42 |
| 3,171,050 | 2/1965 | Gordon | 310/239 |
| 3,444,409 | 5/1969 | Latta et al. | 310/239 |
| 3,463,954 | 8/1969 | Latta et al. | 310/90 |
| 3,471,729 | 10/1969 | Latta et al. | 310/112 |
| 3,510,707 | 5/1970 | Stone et al. | 310/112 |
| 3,873,864 | 3/1975 | Apostoleris | 310/90 |
| 3,988,623 | 10/1976 | Yamaguchi et al. | 310/154 |
| 3,989,320 | 11/1976 | McCloskey | 308/72 |
| 4,074,159 | 4/1976 | Robison | 310/154 |
| 4,155,021 | 5/1979 | Corbach et al. | 310/154 |

FOREIGN PATENT DOCUMENTS 854330  10/1970  Canada ................................ 310/239

Primary Examiner—J. V. Truhe
Assistant Examiner—Morris Ginsburg
Attorney, Agent, or Firm—John C. Dorfman

[57] ABSTRACT

A dynamoelectric machine is provided with a frame structure consisting of at least two fabricated sheet metal pieces of identical shape and size. The sheet metal members are formed to provide cavities to accommodate an armature structure and bearings, and the opposed sheet metal pieces enclose and support the armature and bearing when fixed together. The sheet metal pieces also support preferably a ceramic magnet field by providing formed bosses and tabs for locating and holding the magnets in position. If additional low reluctance flux path is required, a tubular jacket may be placed over the sheet metal housing. The bearings are preferably spherical bearings, and the invention contemplates providing the sheet metal pieces with formed bearing retaining areas and having grooves to retain a fibrous lubricant containing material formed either in the retaining areas or the bearings or both. The brush holders are preferably resinous material molded to provide vanes on sides of the holders to push aside opposed tabs which then engage the vanes and hold the brush holder in place. Brushes fit through passages in the holders of conforming shape and size. An L-shaped terminal fits into a slot parallel to the passage and is latched in place with one leg overlying the opening and holding the end of a spring which engages and urges the brush into contact with the commutator, thereby providing electrical contact.

23 Claims, 14 Drawing Figures

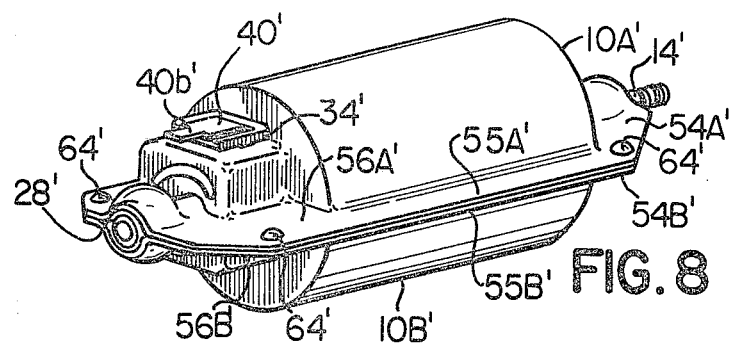
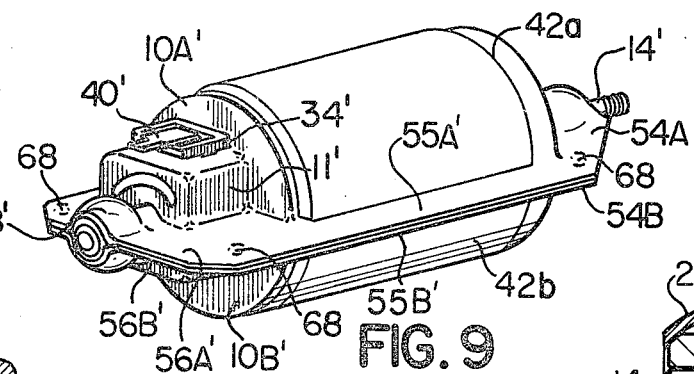
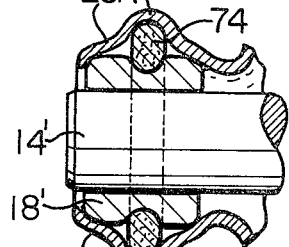
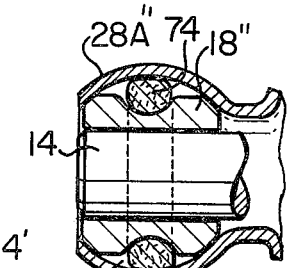
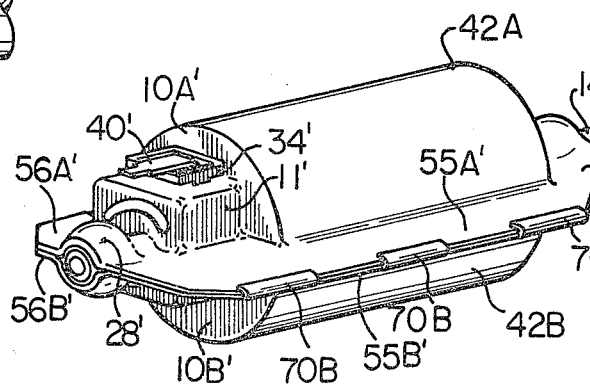
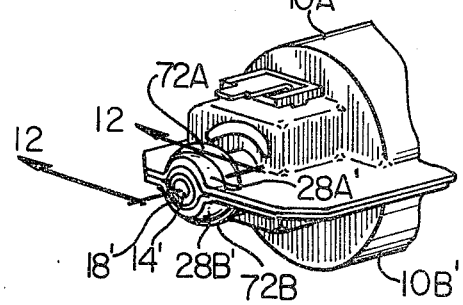
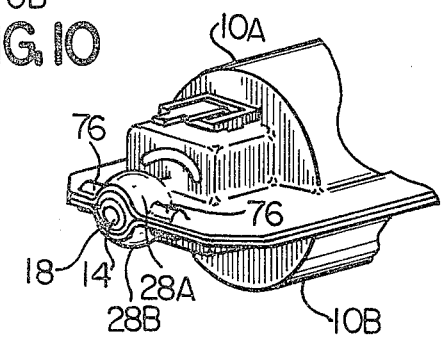

STAMPED SHEET METAL FRAME FOR DYNAMOELECTRIC MACHINE

The present invention relates to a novel motor or other dynamoelectric machine and principally to the frame of that machine which is also a housing which is stamped or otherwise fabricated from sheet metal.

In the prior art great efforts have been made to fabricate motors in a manner which will be inexpensive and yet produce reliable motors. Great progress has been made in using tubular members which are cut off to length and provided with endcaps which support bearings and the like. Other improvements have included the use of molded permanent magnets for fields which save winding fields using conventional cores and conductors.

The present invention is directed to a new approach to a motor construction whereby the frame need not be prefabricated even as a tube but can be stamped from sheet metal as part of the production line process of making the motor. The concept has been derived in stages considering various means of putting the structure together. It contemplates the use of any standard type of armature and preferably journaled or other bearings prefitted to a shaft and providing preferably a spherical or other adaptable outer face which can be clamped between bearing retaining portions of the housing.

The concept is to provide housing parts which may be assembled around the completed armature and commutator with the bearings already in place on the shaft. Instead of sliding the armature into a tubular housing and placing end pieces in place, this invention involves the bringing together from the outside the housing and support frame in pieces from opposite directions to surround the armature and bearing structure and hold it in proper orientation. Preferably, it includes the concept of including in place in the housing as it is assembled the field, whether wound, permanent magnet or other type, and such other parts as terminals, brush holders and the brushes, which must co-act with the commutator.

In the preferred embodiments of the present invention, the frame and housing is provided using two similar pieces. It will be understood that two dissimilar pieces could be used within the scope of the invention, or even more than two pieces. However, for the greatest advantage, the invention contemplates employing identical top and bottom pieces which are brought together to surround the assembled armature shaft and bearings and then securing together these pieces to contain the other parts, and position in proper position the armature relative to the fields and brushes relative to the commutator, and to retain those positions during operation.

More specifically, the present invention relates to a dynamoelectric machine comprising an armature, including a winding on an iron core supported on rotatable shaft, said winding being connected to a commutator supported on the shaft. At least first and second bearings are provided in which the shaft is journaled. Brushes are provided within brush holders positionable to contact the commutator and includes means to provide electrical contact in connection with the brushes and resilient means to urge the brushes into the commutator. Also included are field means conforming to the shape of the armature for generating magnetic field interlinking the armature and producing the desired dynamoelectric effect. Support frame and housing comprising cooperating members which when assembled, can close the armature and provide support for the bearings for the brush holder and the field means to hold the respective parts in proper relative position to the shaft, the armature and the commutator. The support frame pieces must be held together by holding means so that the support frame will be self-supporting and support the bearings and the rotating structure it carries. In turn, the bearing and other parts supported on the housing will cooperate properly with the commutator and other parts on the rotating shaft.

For a better understanding of the present invention, reference is made to the accompanying drawings in which:

FIG. 8 is a perspective view of a modified version of the motor of FIG. 1 which is approximately the same size;

FIG. 9 shows still another variation in a motor according to the present invention;

FIG. 10 shows still another modification to the motor of the present invention;

FIG. 11 is a modification of the present invention similar to FIG. 10 but having modified lubricant reservoir for the bearings;

FIG. 12 is an enlarged axial sectional view taken through the bearing of a structure of FIG. 11 along line 12—12;

FIG. 13 shows a singular sectional view through a modified bearing which might be the bearing of FIG. 8, for example, and;

FIG. 14 is a perspective view of a motor of the same general type having a modified low wick cavity.

Figures 1, 2:
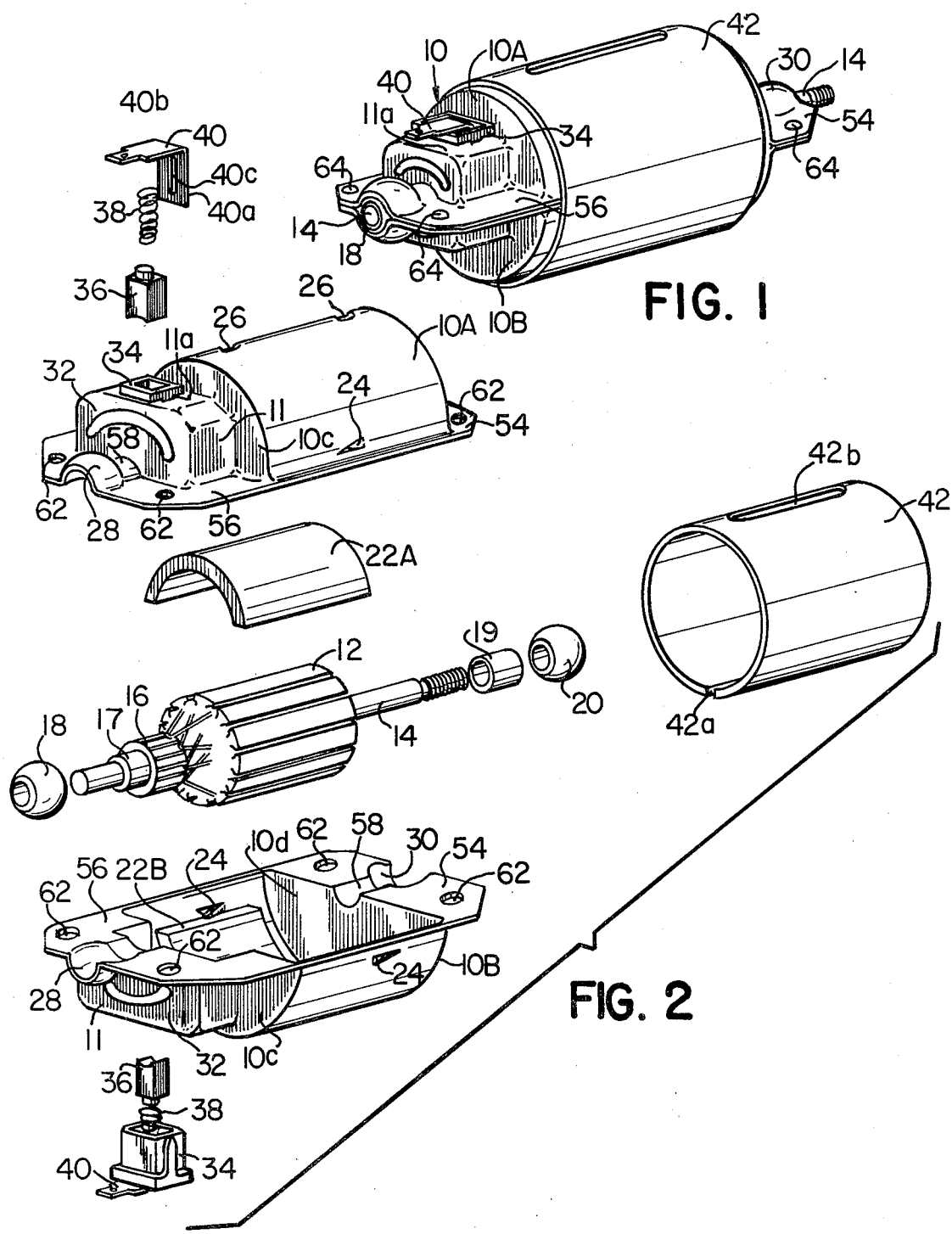
FIG. 1 illustrates a motor made in accordance with the present invention in complete assembled condition.
FIG. 2 is an exploded perspective view of the major parts of the motor of FIG. 1 of approximately the same size as FIG. 1.

Referring first to FIGS. 1 and 2, it will be seen that the motor structure involved includes a motor housing and frame, generally designated 10, and in this preferred embodiment, consisting of identical parts or providing top 10A and bottom 10B of the motor housing when arranged as shown.

The motor housing 10 encloses and supports an armature generally designated 12 consisting of a stack of similar circular stamped laminations of magnetic material which are thus assembled onto a shaft 14 and onto which armature windings are wound. The armature windings, in turn, are connected to a commutator structure 16 in conventional fashion.

The armature is intended to be rotatable about shaft 14, and to that end, shaft 14 is journaled in bearings 18 and 20 which are advantageously sleeve bearings having a generally spherical outer periphery for self alignment purposes as taught in Ser. No. 50,421, filed June 20, 1979, now abandoned, the invention of Kenneth W.

Stewart, Sr. assigned to AMBAC Industries, Incorporated, assignee of the present invention. Also provided are permanent magnet field pieces 22A and 22B, the latter of which is shown in position within its housing half 10B where it is held in position by tab 24 from the middle of the housing 10B which effectively hold the edges of the field magnets rigid against circumferential movement. The fields are preferably ceramic magnets held in place axially between axially spaced shoulders provided by bosses 26. The housing pieces 10A and 10B are preferably stamped or otherwise formed from sheet metal to conform to the outer surfaces of the field members 22A and 22B, respectively, and thereby more accurately hold those pieces in place. They are provided with bearing retaining areas 28 and 30 at opposite ends which are intended to conform to the spherical outer surfaces of the journaled bearings 18 and 20, respectively. When the bearings are clamped between the bearing retaining areas, they are held axially in place. For example, bearing retaining area 28 of opposed pieces 10A and 10B hold bearing 18 so that it cannot move axially, and bearing retaining area 30 of pieces 10A and 10B hold bearing 20 in a similar manner by providing suitable shoulders or positioning means on the shaft 14. The bearings may be suitably arranged on the shaft and positioned for engagement in the bearing retaining area.

Still further embossments 32 of the housing provide means for mounting brush holders 34 which are generally rectangular box enclosures which provide rectangular openings for the brushes as will be described hereafter. The brushes are, in turn, urged into the commutator by springs 38 which are positioned relative to the brush holders 34 by L-shaped terminal tabs 40 which provide a locking leg 40a which slides down within the brush holder 34 and interlocks as will be described hereafter, and a further leg 40b which extends over the spring 38 to hold it in place and extends beyond the brush holder 34 to provide a terminal connection for the brush.

Holding the two halves 10A and 10B of the housing and frame structure together is a flux concentrating magnetic tubular member 42 which is resilient enough so that it may be enlarged to fit over the housing pieces once assembled while clamping them together with residual spring force. The slot 42a provides both a mechanical means allowing the enlargement of the tubular jacket to fit over the housing pieces 10A and 10B and also a magnetic air gap. The slot 42b provides a similar higher reluctance path or air gap opposite the slot 42a but it is connected to mechanically provide an integral structure capable of clamping the parts of the housing together. The tubular member 42 may also serve as a lower reluctance flux path for motor flux in view of the fact that the sheet metal of the housing may be too thin to serve as a sufficient flux path and in view of the fact that the magnets are preferably preformed molded or ceramic magnets and no magnetic core for windings is provided. Thus, the thickness of this member 42 may be varied to supply varying needs for greater or lesser flux path in given applications.

Considering for a moment the structure shown particularly in the exploded view of FIG. 2, it will be clear to the man skilled in the art that the armature can be any well-known prior art type of structure in which, for example, the laminations are first punched out, then, stacked, then, pressed or otherwise suitably secured to the shaft 14. Thereafter, suitable windings are applied by hand or by the many available automatic winding machines and their ends suitably connected to individual bars of the commutator 16 by techniques that are well known and practiced widely in the motor field. The commutator 16 is made separately and suitably mounted on the shaft 14 at the same time the armature laminations are put in place so that it is ready for electrical connection.

After the armature has been constructed in accordance with the present invention, the bearings are put in place, ordinarily by simply slipping journal bearings of the type illustrated here over the ends of the shaft. Of course, if ball or roller bearings are used in a particular application, they will be press fitted or otherwise fixed in place in a conventional fashion. In the structure shown, a spacer 17 is provided between the commutator and the bearing at one end of the shaft in order to axially position the bearing a proper distance away from the commutator and make sure that the commutator will clear the housing when put in place and never be in danger of axially slipping so that the housing structure interferes with the rotating commutator. A similar tubular spacer 19 is inserted over the opposite end of the shaft 14 prior to putting journal bearing 20 in place in order to fix the axial spacing of the bearing from the end of the armature and prevent axial shifting which would cause interferance with the housing. The assembly of these parts can be done automatically in the course of an assembly line build up of the armature structure.

The separate halves of the housing 10A and 10B have assembled into them the respective field magnets 22A and 22B prior to assembly of the housing to the armature. The magnets 22A and 22B preferably are of a semitubular form of a fixed internal and external radius. The external radius corresponds to the radius of the inside of the housing so that it can fit in place in only one orientation within the housing. The field magnet 22A, for example, is located axially in proper position between indexing means on the housing which may conveniently be bosses 26 providing preformed shoulders within the housing which prevent axial movement of the magnets once they have been assembled and properly located with respect to the armature 12. The tabs 24 may be formed by lancing and may be so orientated that they provide effectively a cam surface which allows the magnet to be slipped into the housing piece but prevent its removal by resiliently moving inward as the magnet is pushed into place so that they closely confine the magnet to one position circumferentially of the housing and form stops preventing movement rotationally in either direction once the magnet is in place. It is also possible, of course, to perform the lancing once the magnet is in position and to bend the tabs provided to hold the magnets in place beyond their elastic limit so that they are permanently deformed rather than being resiliently urged into overlying position. It is also possible to use multiple tabs corresponding to tabs 24 to hold magnets circumferentially in place and also possible to use more than one boss 26 or other means of holding the magnets axially aligned. Of course, it will be understood that the magnets can be held within the housing in various other ways including gluing, in which case the indexing means may be dispensed with altogether.

Figure 3:
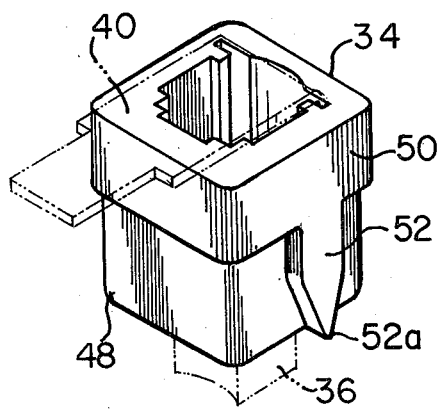
FIG. 3 is an enlarged perspective view of brush holder of the invention.
Figure 4:
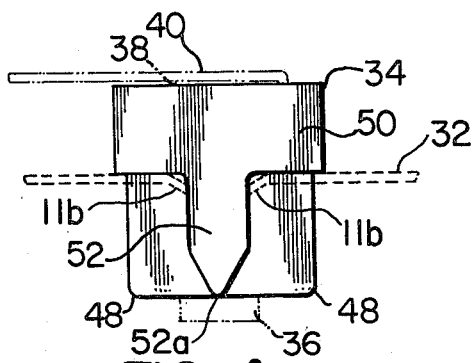
FIG. 4 shows a side sectional view of the same brush holder.
Figure 5:
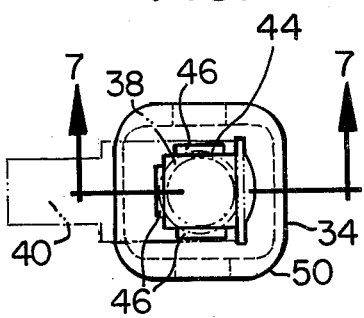
FIG. 5 shows a slightly smaller top view of the brush holder seen in FIGS. 1 and 2.
Figure 6:
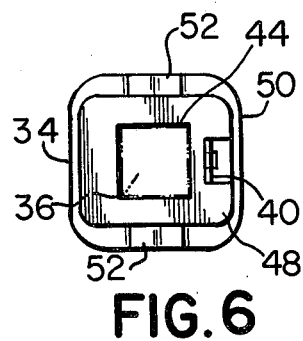
FIG. 6 is a bottom plan view of the brush holder of FIGS. 3 through 5.
Figure 7:
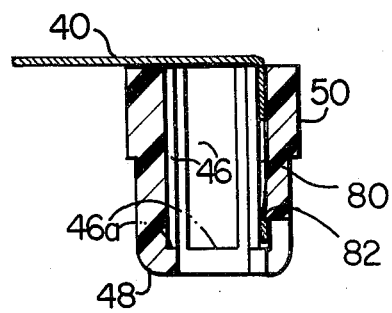
FIG. 7 is a sectional view taken along line 7—7 of FIG. 5.

The brush holders 34 may be seen in greater detail in FIGS. 3, 4, 5, 6 and 7. As indicated in the sectional view of FIG. 4, the brush holders are preferably molded of resinous material, although they can be made of any suitable material and machined or otherwise fabricated if desired. In their preferred configuration, the brush holders are provided as been seen in FIGS. 5 and 6 with a square bore 44 extending through the brush holders. This square bore passage 44 is bounded in each wall by a similar alcove groove 46 which, as seen in FIG. 7, is terminated short of the inner or commutator proximate end of the brush holder in shoulders 46a. The outside of the brush holder preferably has rounded corners 48 at its bottom end to facilitate insertion into the sheet metal housing. It is provided with a peripheral flange 50 at its upper end, and as seen in FIG. 3, the flange 50 along two sides is extended downwardly in a vane 52 which is provided with pointed end 52a which functionally acts on portions of the sheet metal housing as described.

Returning to FIG. 2, it will be seen that the brush holders 34 are inserted into each of the housings in a generally rectangular box area 11 which provides an extension to the cylindrical area housing the armature and terminated by flat radially directed wall 10c at the commutator end of the housing. A similar flat wall 10d is provided at the opposite end of the housing so as to provide, in a preferred embodiment, a distinctly cylindrical housing for the armature part of the motor terminating in an essentially square or rectangular box form housing the commutator. One functional reason for the box form 11 is to provide flat surfaces 11a providing good indexing for the brush holder 34.

In stamping the housing, of course, each of the features may be stamped in a single or successive step of this stamping operation using appropriate dies, and metal may be punched out to permit access of the brush holders through the surface 11a. Preferably, however, at the edges which accommodate the vane 52, opposing tabs 11b are lanced along each lateral edge of the punched out areas of flat surface 32 so as to provide holding tabs 11b of some resiliency which are displaced by the pointed end 52a of the vane 52 as the brush holder is pushed in through the opening as best seen in phantom view of FIG. 4. As this occurs, the opposing tabs 11b yield, and their ends follow the edges of vane 52 starting with the point 52a, permitting easy inward movement of the brush holder but opposing withdrawal. Thus, the brush holder should be preassembled with the brushes 36, springs 38 and the terminals 40 all in place. In this regard, it will be appreciated that the springs 38 are preferably selected from suitable material in helical form having a diameter greater than the bore accommodating the brush but smaller than the diagonal and of a size to fit within the alcoves 46. The terminal area 40a also slides within the back alcove which preferably is arranged to be located intermediate the walls bearing the vanes 52 and the terminal tab which also serves to hold one end of the spring in place so that it is compressed and urges the brush into contact with the commutator 16. The terminal 40 has a locking slot 40c which is preferably engaged under a shoulder 82 within the brush holder and tends to hold the terminal in place.

The motor housing in the construction of FIGS. 1 and 2 is provided with flat flanges 54 and 56 at axially opposite ends of the housing. Flange 54 extends axially away from wall 10d of the cylindrical portion of the housing. That includes bearing retaining area 30 and a semi-cylindrical channel 58 to facilitate passage of the shaft 14. Flange 56 extends at a right angle from wall 10c and from the commutator housing 11 and is interrupted by bearing retaining area 28. In short, semi-cylindrical shaft channel 58 on flanges 54 and 56 on parts 10A and 10B are opposed and provide the means of fastening the two halves of the housing together. Similarly, flanges 54 and 56 are opposed and facilitate fastening together. In each case, the flanges are provided with eyelets 62 which are located so that they mate with opposing eyelets and provide means through which fastening means may extend. Fastening means may be removable means such as bolts and screws but commonly may be such things as rivets which can be easily positioned and peinned into final locking form automatically in the course of assembly and production.

As already suggested, FIG. 8 shows a variation of which the opposed flattened fastening flanges 54A' and 56A' have been extended radially further outward and joined together by connecting flanges 55A' and 55B'. The other parts of the structure can be presumed to be generally the same and are shown to have corresponding number designators with the addition of a prime to each.

It will be understood that the principal effect of this modified construction is to eliminate the possibility of using a continuous flux concentrator tube 42, or at least one of such simple tubular construction as in FIG. 1. Nevertheless, the use of the flanges tends to somehow improve the flux characteristics in the absence of a flux concentrator from this structure of FIG. 1.

FIG. 9 is the structure of FIG. 8 with the extended flanges as described, but in this case the flanges are welded together at point 68. In place of using fasteners through eyelets, welds in fact may be placed any place along the flanges where it is thought desirable to hold them in place. In addition, since welding is employed, welding may be used to spot weld arcuate flux rings 42a and 42b which are semi-cylindrical and thus give the advantages of a flux ring and the wider flange. FIG. 10 shows still another variation of the structure in terms of the general structure of FIGS. 8 and 9 which is similarly numbered but wherein one of the edges of the flanges is provided with fold tabs 70B which can be bent back over the adjacent edge of the flange opposed as seen in FIG. 10. It will be understood that only one edge of the flange will be provided with these tabs so that as seen on the side closest to the viewer in FIG. 10 the tabs 70B are bent up from flanges 55B', and on the other side of the structure the flanges will have the same arrangement and are bent downwardly from the top half of the housing beneath the lower corresponding flange.

FIG. 11 differs from FIG. 9 only in that there is also provided a lubricant reservoir formed into each half housing 10A' and 10B'. It will be understood that there may be a lubricant reservoir for each of the bearings at opposite ends of the housing, but the one in bearing retaining area, or specifically in the halves 28A' and 28B', appears as a semi-circumferential channel 72A and 72B as shown. As seen in FIG. 12, a fiber ring impregnated with the lubricant is received within the channel 72A and 72B, and in this case, the journal bearing 18' is modified so that it presents a spherical surface to contact the spherical-shaped bearing retaining portions 28A' and 28B', but is modified to provide a circumferential groove around the bearing and opposed to grooves 72A and 72B in the housing. The lubricant retained within the fiber ring 74 will gradually work its way into the bearing. The material of the fiber can be of the various known types used for oil wicks or any of the many new materials which are being developed for such purposes.

The modification of this arrangement is shown in FIG. 13 which is a modification of the structure of FIG.

12 but wherein the bearing retaining portions 28A″ and 28B″ are not provided with the channel portions but instead present a generally spherical interior surface as previously described. A ring oil wick suitably impregnated with lubricant is retained wholly within a circumferential groove 18A′ which necessarily has to be somewhat deeper than the groove of FIG. 12. In other respects, the bearing 18″ is quite similar and certainly its journal effect upon the shaft 14 and its retention within the bearing retainer portions 28A″ and 28B″ is similar.

Referring to FIG. 14, still another modification for providing lubrication of the bearings is illustrated. In this case, radially directed compartments 76 are provided, preferably on each side of the bearing retaining means 28A and 28B. More wick materials suitably impregnated with lubricant may be provided in this instance and either the material may be simply retained loosely within the cylindrical stubs thereby provided which terminate at the bearing 18, or spring loaded lubricant means may be provided to impose some pressure on a lubricant device within the stubs 76.

Numerous embodiments have been described in connection with the present invention, and it will occur to those skilled in the art that other embodiments are also possible. The present invention contemplates such additional embodiments, and all such modifications and variations within the scope of the claims are intended to be within the scope and spirit of the present invention.

What is claimed is:

1. A dynamoelectric machine comprising:
an armature, including a winding on an iron core supported on a rotatable shaft, said winding being connected to a commutator supported on the shaft;
first and second bearings in which the shaft is journaled;
brush holders containing brushes for contacting the commutator, resilient means to urge the brushes into the commutator and means to provide electrical contact and connection with the brushes;
permanent magnet field means conforming to the shape of the armature for generating a magnetic field interlinking the armature and producing the desired dynamoelectric effect;
a support frame and housing comprising two cooperating fabricated sheet metal members which includes means providing support for the brush holders to be in position for the brushes to contact the commutator and for supporting the field means relative to the armature and when assembled together provide support for the bearings and enclose the armature and commutator and which permit the brushes to be mounted to engage the commutator after assembly of said frame and housing; and
means for holding the fabricated sheet metal members of the support frame and housing together, and, in turn, to support the bearings.

2. The dynamoelectric machine of claim 1 in which the support frame and housing comprises two sheet metal members.

3. The dynamoelectric machine of claim 2 in which the two fabricated sheet metal members employed are exactly alike.

4. The dynamoelectric machine of claim 2 in which the sheet metal members are fabricated to leave flanges in a common plane on each fabricated sheet metal member whereby opposed flanges support the means for holding the fabricated sheet metal members together.

5. The dynamoelectric machine of claim 4 in which flanges in the same plane are provided at each end near the bearing support.

6. The dynamoelectric machine of claim 5 in which the means holding the fabricated sheet metal members together are rivets extending through aligned holes in the flanges.

7. The dynamoelectric machine of claim 4 in which the means holding the fabricated sheet metal members together are welds through the flanges.

8. The dynamoelectric machine of claim 3 in which the fabricated sheet metal members which provide support for the field means include at least a pair of metal tabs engaging opposite edges of the field means.

9. The dynamoelectric machine of claim 3 in which the fabricated sheet metal members include similar semi-cylindrical portions whose diameters conform to the outer diameter of preformed permanent magnet field means and indexing stop means are provided extending inward from a cylindrical metal surface of said portions to provide means for locating and holding axially the proper position of the field means and other means are provided circumferentially at opposite edges of the field means projecting inwardly from the cylindrical sheet metal surface and engaging the opposite edges to hold the field means in place.

10. The dynamoelectric machine of claim 9 in which the means holding the field means in place are tabs punched into the cylindrical wall of the fabricated sheet metal members to provide stops each with an inward extending component which engages the edges of the field means.

11. The dynamoelectric machine of claim 9 in which the indexing means indexing the axial location of the field means includes inwardly projecting boss means on the sheet metal members providing shoulder stops to engage the edge of the field means and hold it properly indexed in position.

12. The dynamoelectric machine of claim 1 in which a portion of each cooperating sheet metal member when assembled together provides support for the bearings within cavities the shape of the outer surface of the bearings in order to engage and hold the bearings.

13. The dynamoelectric machine of claim 3 in which a portion of the cooperating fabricated sheet metal members which provide support for the bearings is fabricated into a generally spherical surface of a diameter approximately the outer diameter of a spherical bearing.

14. The dynamoelectric machine of claim 12 in which the outer surface of each of the bearings is provided with a circumferential channel in which are placed fibrous material impregnated with lubricant for the bearing.

15. The dynamoelectric machine of claim 14 in which the portion of the fabricated sheet metal member receiving the bearing is also formed to provide a circumferential channel extending away from the bearing and in which a fibrous lubricant impregnated element may be placed.

16. The dynamoelectric machine of claim 12 in which at least one of the sheet metal members providing the support frame and housing is provided with a channel extending away from the bearing support cavity in which may be placed fibrous material impregnated with lubricant.

17. The dynamoelectric machine of claim 1 in which the portions of the sheet metal members which enclose the armature are arranged to provide a generally cylindrical cavity and a cylindrical outer wall when assembled and a generally tubular flux concentrator of low permeability material and resilience is placed over a cylindrical portion of the sheet metal members in such a way as to provide a low reluctance flux path for flux which may be generated in the dynamoelectric machine.

18. The dynamoelectric machine of claim 17 in which the flux concentrator is a one piece tubular member having an elemental gap along one edge and sufficient resilience to generally retain and return to its shape.

19. The dynamoelectric machine of claim 17 in which the flux concentrator is made up of a number of pieces affixed to a cylindrical armature housing portion of the sheet metal members.

20. The dynamoelectric machine of claim 1 in which the brush holders are provided by molded inserts in which the brushes slide and are urged into the commutator by spring means and each brush holder is provided with means including vane means on its opposite edges, the ends of which engage opposed lanced tab portions of the sheet metal housing adjacent a hole through which the brush holder is inserted into the housing whereby the lanced metal tab portions will engage the vane means and prevent the brush holder from being withdrawn from the direction of its insertion.

21. The dynamoelectric machine of claim 20 in which the ends of the vane means are pointed to initially deflect the sheet metal and a collar is provided around the top of the brush holder larger than the hole so as to limit the distance which the brush holder may be pressed into the sheet metal housing.

22. The dynamoelectric machine of claim 1 in which molded resinous brush holders are provided for the brushes for the commutator and suitably secured to the sheet metal members wherein each brush holder provides an opening the shape of the brush straight through the brush holder toward the commutator and a slot beside the opening to accept one leg of an L-shaped, terminal locking means interengaging between the L-shaped terminal and the brush holder to hold the L-shaped terminal in position to overlie the opened end of the brush holder remote from the commutator and supply stop means and electrical contact for a conductive spring which also contacts the brush and urges it toward the commutator.

23. The brush holder of claim 22 in which the spring employed is a helical spring somewhat larger in diameter than the width of the brush and additional grooved alcoves are provided in the sidewalls of a brush channel to accommodate the spring.

* * * * *